United States Patent
Azuma et al.

(10) Patent No.: US 9,313,650 B2
(45) Date of Patent: Apr. 12, 2016

(54) COMMUNICATIONS SYSTEM, MOBILE COMMUNICATIONS DEVICE, TRANSITION CONTROL DEVICE, TRANSITION CONTROL METHOD, AND TRANSITION CONTROL PROGRAM

(71) Applicant: NTT DOCOMO, INC., Chiyoda-ku (JP)

(72) Inventors: Teppei Azuma, Chiyoda-ku (JP); Kazunari Suzuki, Chiyoda-ku (JP); Koutarou Nagase, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 14/380,843

(22) PCT Filed: Oct. 22, 2013

(86) PCT No.: PCT/JP2013/078562
§ 371 (c)(1),
(2) Date: Aug. 25, 2014

(87) PCT Pub. No.: WO2014/065273
PCT Pub. Date: May 1, 2014

(65) Prior Publication Data
US 2015/0038119 A1 Feb. 5, 2015

(30) Foreign Application Priority Data
Oct. 22, 2012 (JP) .................................. 2012-232992

(51) Int. Cl.
*H04M 1/66* (2006.01)
*H04W 8/22* (2009.01)
*H04W 8/20* (2009.01)
*H04W 12/06* (2009.01)
*H04L 29/06* (2006.01)

(52) U.S. Cl.
CPC ............. *H04W 8/22* (2013.01); *H04L 63/0853* (2013.01); *H04W 8/205* (2013.01); *H04W 12/06* (2013.01)

(58) Field of Classification Search
CPC .................................................... H04L 63/0853
See application file for complete search history.

(56) References Cited

U.S. PATENT DOCUMENTS

| 2010/0035612 A1* | 2/2010 | Liang .......................... 455/435.1 |
| 2012/0117210 A1* | 5/2012 | Naito .................. H04L 63/0853 709/221 |
| 2012/0207023 A1* | 8/2012 | Tsuda ............................ 370/235 |
| 2013/0115962 A1* | 5/2013 | Nakamura ........ H04W 52/0274 455/450 |

OTHER PUBLICATIONS

European Telecommunication Standards Institute, "Smart Cards; UICC-Terminal interface; Physical and logical characteristics", ETSI TS 102 221, V11.0.0, Release 11, pp. 1-181, (Jun. 2012).
International Search Report Issued Nov. 26, 2013 in PCT/JP13/078562 Filed Oct. 22, 2013.
International Preliminary Report on Patentability and Written Opinion issued May 7, 2015 in PCT/JP2013/078562 filed on Oct. 22, 2013(English translation only).

* cited by examiner

*Primary Examiner* — Sam K Ahn
*Assistant Examiner* — Fabricio R Murillo Garcia
(74) *Attorney, Agent, or Firm* — Oblon, McClelland, Maier & Neustadt, L.L.P.

(57) ABSTRACT

In order to perform SM swap efficiently, a mobile communication device that performs mobile communication includes: an attachment unit for attaching thereto an embedded subscriber identity module (eSIM) that stores therein an Operational Profile (OP) and a Provisioning Profile (PP); a PP reception unit for receiving, through a mobile communication network associated with the OP stored in the eSIM, the PP associated with an Subscription Manager (SM) corresponding to a destination mobile communication network, and storing the received PP in the eSIM; and an OP reception unit for performing communication with the SM using the stored PP associated with the SM to receive the OP associated with the mobile communication network, and storing the received OP in the eSIM.

10 Claims, 7 Drawing Sheets

COMMUNICATIONS SYSTEM, MOBILE COMMUNICATIONS DEVICE, TRANSITION CONTROL DEVICE, TRANSITION CONTROL METHOD, AND TRANSITION CONTROL PROGRAM

TECHNICAL FIELD

The present invention relates to a communication system, a mobile communication device, a transition control device, a transition control method, and a transition control program.

BACKGROUND ART

In general, in mobile phones, a subscriber identity module (SIM) card, which is a subscriber authentication module having subscriber information recorded thereon, is inserted into a mobile phone to enable mobile communication. Here, the specifications for SIM cards are standardized by the European Telecommunications Standards Institute (ETSI) (for example, Non Patent Literature 1 below).

CITATION LIST

Non Patent Literature

Non Patent Literature 1: ETSI TS102 221 V11.0.0 (2012 June)

ETSI is now aiming to standardize embedded SIMs (eSIMs) in which information in SIMs can be rewritten by remote control. An eSIM stores profiles called an Operational Profile (OP) and a Provisioning Profile (PP). The OP is information necessary for performing mobile communication over a mobile communication network provided by a particular mobile communication carrier. An eSIM enables mobile communication over the corresponding mobile communication network by using the OP stored in the eSIM. The OP is managed by a connection information management server called a Subscription Manager (SM). The mobile communication network corresponding to the OP managed by a certain SM is hereinafter referred to as the mobile communication network belonging to the SM.

The PP is information necessary for performing communication between an eSIM storing the PP and an SM, and includes an authentication key for communication between the eSIM and the SM. The eSIM storing the PP uses the PP to perform communication with the SM and acquires the OP from the SM through the communication. The eSIM thus enables mobile communication over the corresponding mobile communication network by using the acquired OP as previously mentioned.

SUMMARY OF INVENTION

Technical Problem

Here, each SM is managed by individual corporations or groups, and information is not flexibly shared among the plurality of SMs. For example, unless the authentication key between the eSIM and the certain SM, which is included in the PP, is shared between the SMs, the PP cannot be shared between the SMs. In this case, as for the mobile communication networks over which the eSIM performs mobile communication, when a transition is made from a mobile communication network belonging to the certain SM to a different mobile communication network belonging to another SM (SM swap), a PP for communicating with the destination SM has to be prepared, for example, by the user of the eSIM every time a transition is made, and the SM swap cannot be performed efficiently.

The present invention is made to solve such a problem and aims to provide a communication system, a mobile communication device, a transition control device, a transition control method, and a transition control program to allow the SM swap to be performed more efficiently.

Solution to Problem

In order to achieve the object, a communication system according to an aspect of the present invention includes a mobile communication device that performs mobile communication and a transition control device that controls a transition between mobile communication networks over which the mobile communication device performs mobile communication. The mobile communication device includes: attachment means for attaching thereto a subscriber authentication module that stores therein first connection information and second connection information, the first connection information corresponding to a mobile communication network and being necessary for performing mobile communication over the mobile communication network, the second connection information being necessary for performing communication with a connection information management server provided corresponding to a mobile communication network and configured to perform rewrite control on the first connection information; first reception means for receiving, through a mobile communication network associated with the first connection information stored in the subscriber authentication module attached by the attachment means, the second connection information associated with a connection information management server corresponding to a destination mobile communication network different from the mobile communication network, and storing the received second connection information in the subscriber authentication module; and second reception means for performing communication with the connection information management server corresponding to the destination mobile communication network, using the second connection information received by the first reception means and stored in the subscriber authentication module attached by the attachment means, to receive the first connection information associated with the destination mobile communication network, and storing the received first connection information in the subscriber authentication module. The transition control device includes: transition request input means for inputting a transition request to make a transition between mobile communication networks over which the mobile communication device performs mobile communication; first transmission means for transmitting the second connection information associated with the connection information management server corresponding to the destination mobile communication network, to the mobile communication device associated with the transition request input by the transition request input means, through a source mobile communication network; and second transmission means for generating the first connection information associated with the destination mobile communication network for the mobile communication device associated with the transition request input by the transition request input means, and transmitting the generated first connection information to the connection information management server corresponding to the destination mobile communication network.

In the communication system according to this aspect of the present invention, based on a transition request, the first reception means of the mobile communication device receives, through the mobile communication network associated with the first connection information stored in the subscriber authentication module attached by the attachment means, the second connection information associated with the connection information management server corresponding to the destination mobile communication network different from the mobile communication network, and stores the received second connection information in the subscriber authentication module. The second reception means of the mobile communication device performs communication with the connection information management server corresponding to the destination mobile communication network, using the second connection information, to receive the first connection information associated with the destination mobile communication network, and stores the received first connection information in the subscriber authentication module. That is, the mobile communication device acquires the second connection information for performing communication with the connection information management server corresponding to the destination mobile communication network in advance through the source mobile communication network and performs communication with the corresponding connection information management server using the second connection information to receive the first connection information for performing mobile communication over the destination mobile communication network. This enables the mobile communication device to perform mobile communication over the destination mobile communication network. As described above, the SM swap can be performed more efficiently without any special intervention by the user.

The mobile communication device may further include transition request transmission means for transmitting a transition request to make a transition between mobile communication networks over which mobile communication is performed. The transition request input means of the transition control device may input the transition request transmitted by the transition request transmission means of the mobile communication device. This configuration enables a transition based on the transition request from the mobile communication terminal side, so that a transition can be performed at the timing desired by the mobile communication terminal side.

The mobile communication device may further include connection information deletion means for deleting the first connection information stored in the subscriber authentication module attached by the attachment means. This configuration ensures that the first connection information will be deleted, for example, when mobile communication over the mobile communication network associated with the first connection information becomes unnecessary.

A mobile communication device according to another aspect of the present invention performs mobile communication and includes: attachment means for attaching thereto a subscriber authentication module that stores therein first connection information and second connection information, the first connection information corresponding to a mobile communication network and being necessary for performing mobile communication over the mobile communication network, the second connection information being necessary for performing communication with a connection information management server provided corresponding to a mobile communication network and configured to perform rewrite control on the first connection information; first reception means for receiving, through a mobile communication network associated with the first connection information stored in the subscriber authentication module attached by the attachment means, the second connection information associated with a connection information management server corresponding to a destination mobile communication network different from the mobile communication network, and storing the received second connection information in the subscriber authentication module; and second reception means for performing communication with the connection information management server corresponding to the destination mobile communication network, using the second connection information received by the first reception means and stored in the subscriber authentication module attached by the attachment means, to receive the first connection information associated with the destination mobile communication network, and storing the received first connection information in the subscriber authentication module.

In the mobile communication device according to this aspect of the present invention, the first reception means receives, through a mobile communication network associated with the first connection information stored in the subscriber authentication module attached by the attachment means, the second connection information associated with a connection information management server corresponding to a destination mobile communication network different from the mobile communication network, and stores the received second connection information in the subscriber authentication module. The second reception means then performs communication with the connection information management server corresponding to the destination mobile communication network, using the second connection information, to receive the first connection information associated with the destination mobile communication network, and stores the received first connection information in the subscriber authentication module. That is, the mobile communication device acquires the second connection information for performing communication with the connection information management server corresponding to the destination mobile communication network in advance through the source mobile communication network and performs communication with the corresponding connection information management server using the second connection information to receive the first connection information for performing mobile communication over the destination mobile communication network. This enables the mobile communication device to perform mobile communication over the destination mobile communication network. As described above, the SM swap can be performed more efficiently without any special intervention by the user.

A transition control device according to another aspect of the present invention includes transition request input means for inputting a transition request to make a transition between mobile communication networks over which a mobile communication device performs mobile communication. The mobile communication device includes attachment means for attaching thereto a subscriber authentication module that stores therein first connection information and second connection information, the first connection information corresponding to a mobile communication network and being necessary for performing mobile communication over the mobile communication network and the second connection information being necessary for performing communication with a connection information management server provided corresponding to a mobile communication network and configured to perform rewrite control on the first connection information. The transition control device further includes: first transmission means for transmitting the second connection information associated with a connection information management server corresponding to a destination mobile communication network, to the mobile communication device associated with the transition request input by the transition request input means, through a source mobile communication network; and second transmission means for generating the first connection information associated with the destination mobile communication network for the mobile communication device associated with the transition request input by the transition request input means, and transmitting the generated first connection information to the connection information management server corresponding to the destination mobile communication network.

In the transition control device according to this aspect of the present invention, the transition request input means inputs a transition request. The first transmission means transmits the second connection information associated with the connection information management server corresponding to the destination mobile communication network, to the mobile communication device associated with the input transition request through the source mobile communication network. The second transmission means generates the first connection information associated with the destination mobile communication network and transmits the generated first connection information to the connection information management server corresponding to the destination mobile communication network. The mobile communication device thus can acquire the second connection information for performing communication with the connection information management server corresponding to the destination mobile communication network in advance through the source mobile communication network and perform communication with the corresponding connection information management server using the second connection information to receive the first connection information for performing mobile communication over the destination mobile communication network. This enables the mobile communication device to perform mobile communication over the destination mobile communication network. As described above, the SM swap can be performed more efficiently without any special intervention by the user.

According to aspects of the present invention, the invention can be described not only as a communication system, a mobile communication device, and a transition control device as described above but also as a transition control method and a transition control program as follows. They are different only in categories and are substantially the identical invention achieving the same operation and effects.

A transition control method according to another aspect of the present invention is performed in a communication system including a mobile communication device that performs mobile communication and a transition control device that controls a transition between mobile communication networks over which the mobile communication device performs mobile communication. The mobile communication device includes attachment means for attaching thereto a subscriber authentication module that stores therein first connection information and second connection information, the first connection information corresponding to a mobile communication network and being necessary for performing mobile communication over the mobile communication network, the second connection information being necessary for performing communication with a connection information management server provided corresponding to a mobile communication network and configured to perform rewrite control on the first connection information. The transition control method includes: a transition request input step, by the transition control device, of inputting a transition request to make a transition between mobile communication networks over which the mobile communication device performs mobile communication; a first transmission step, by the transition control device, of transmitting the second connection information associated with a connection information management server corresponding to a destination mobile communication network, to the mobile communication device associated with the transition request input in the transition request input step, through a source mobile communication network; a first reception step, by the mobile communication device, of receiving the second connection information transmitted in the first transmission step through the source mobile communication network, and storing the received second connection information in the subscriber authentication module; a second transmission step, by the transition control device, of generating the first connection information associated with the destination mobile communication network for the mobile communication device associated with the transition request input in the transition request input step, and transmitting the generated first connection information to the connection information management server corresponding to the destination mobile communication network; and a second reception step, by the mobile communication device, of performing communication with the connection information management server corresponding to the destination mobile communication network, using the second connection information received in the first reception step and stored in the subscriber authentication module attached by the attachment means, to receive the first connection information associated with the destination mobile communication network that is transmitted to the connection information management server in the second transmission step, and storing the received first connection information in the subscriber authentication module.

A transition control method according to an aspect of the present invention is performed by a mobile communication device that performs mobile communication. The mobile communication device includes attachment means for attaching thereto a subscriber authentication module that stores therein first connection information and second connection information, the first connection information corresponding to a mobile communication network and being necessary for performing mobile communication over the mobile communication network, the second connection information being necessary for performing communication with a connection information management server provided corresponding to a mobile communication network and configured to perform rewrite control on the first connection information. The transition control method includes: a first reception step of receiving, through a mobile communication network associated with the first connection information stored in the subscriber authentication module attached by the attachment means, the second connection information associated with a connection information management server corresponding to a destination mobile communication network different from the mobile communication network, and storing the received second connection information in the subscriber authentication module; and a second reception step of performing communication with the connection information management server corresponding to the destination mobile communication network, using the second connection information received in the first reception step and stored in the subscriber authentication module attached by the attachment means, to receive the first connection information associated with the destination mobile communication network, and storing the received first connection information in the subscriber authentication module.

A transition control method according to another aspect of the present invention is performed by a transition control device that controls a transition between mobile communication networks over which a mobile communication device performs mobile communication. The transition control method includes: a transition request input step of inputting a transition request to make a transition between mobile communication networks over which a mobile communication device performs mobile communication. The mobile communication device includes attachment means for attaching thereto a subscriber authentication module that stores therein first connection information and second connection information, the first connection information corresponding to a mobile communication network and being necessary for performing mobile communication over the mobile communication network, the second connection information being necessary for performing communication with a connection information management server provided corresponding to a mobile communication network and configured to perform rewrite control on the first connection information. The transition control device further includes: a first transmission step of transmitting the second connection information associated with a connection information management server corresponding to a destination mobile communication network, to the mobile communication device associated with the transition request input in the transition request input step, through a source mobile communication network; and a second transmission step of generating the first connection information associated with the destination mobile communication network for the mobile communication device associated with the transition request input in the transition request input step, and transmitting the generated first connection information to the connection information management server corresponding to the destination mobile communication network.

A transition control program according to another aspect of the present invention causes a mobile communication device, where the mobile communication device includes attachment means for attaching thereto a subscriber authentication module that stores therein first connection information and second connection information, the first connection information corresponding to a mobile communication network and being necessary for performing mobile communication over the mobile communication network, the second connection information being necessary for performing communication with a connection information management server provided corresponding to a mobile communication network and configured to perform rewrite control on the first connection information and performs mobile communication, to function as: first reception means for receiving, through a mobile communication network associated with the first connection information stored in the subscriber authentication module attached by the attachment means, the second connection information associated with a connection information management server corresponding to a destination mobile communication network different from the mobile communication network, and storing the received second connection information in the subscriber authentication module; and second reception means for performing communication with the connection information management server corresponding to the destination mobile communication network, using the second connection information received by the first reception means and stored in the subscriber authentication module, to receive the first connection information associated with the destination mobile communication network, and storing the received first connection information in the subscriber authentication module.

A transition control program according to another aspect of the present invention causes a computer to function as a transition request input means for inputting a transition request to make a transition between mobile communication networks over which a mobile communication device performs mobile communication. The mobile communication device includes attachment means for attaching thereto a subscriber authentication module that stores therein first connection information and second connection information, the first connection information corresponding to a mobile communication network and being necessary for performing mobile communication over the mobile communication network, the second connection information being necessary for performing communication with a connection information management server provided corresponding to a mobile communication network and configured to perform rewrite control on the first connection information. The transition control program further causes the computer to function as: first transmission means for transmitting the second connection information associated with a connection information management server corresponding to a destination mobile communication network, to the mobile communication device associated with the transition request input by the transition request input means, through a source mobile communication network; and second transmission means for generating the first connection information associated with the destination mobile communication network for the mobile communication device associated with the transition request input by the transition request input means, and transmitting the generated first connection information to the connection information management server corresponding to the destination mobile communication network.

Advantageous Effects of Invention

The SM swap can be performed more efficiently.

DESCRIPTION OF EMBODIMENTS

An embodiment of a communication system, a mobile communication device, a transition control device, a transition control method, and a transition control program will be described in details below in conjunction with reference to the figures. In the description of the figures, the same elements are denoted with the same reference signs and an overlapping description will be omitted.

Figure 1:
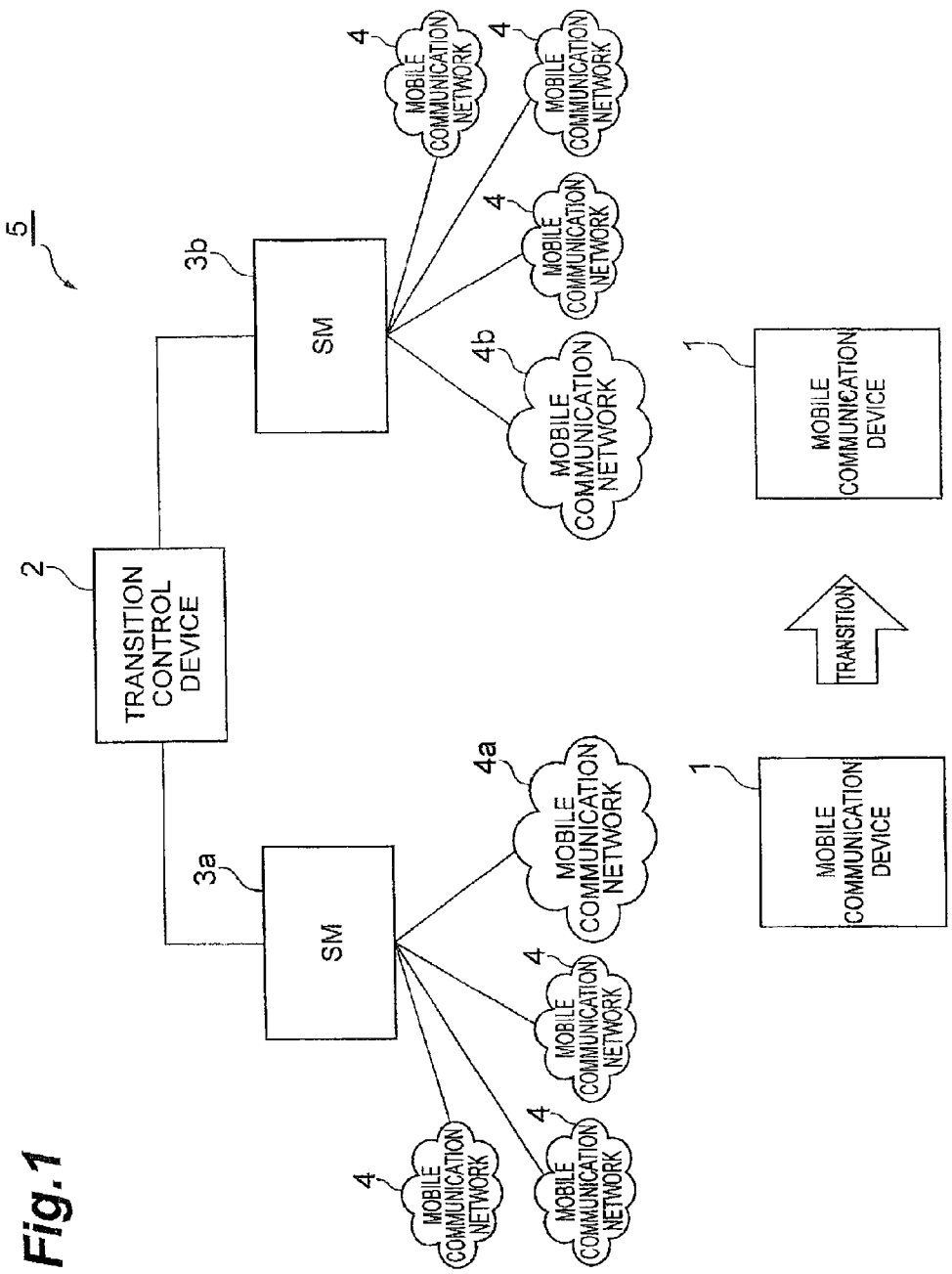
FIG. 1 is an overall configuration diagram of a communication system according to an embodiment of the present invention.

FIG. 1 is an overall configuration diagram of a communication system 5 according to the present embodiment. As shown in FIG. 1, the communication system 5 includes a mobile communication device 1 (mobile communication device), a transition control device 2 (transition control device), Subscription Managers (SMs) 3 (connection information management servers), and mobile communication networks 4. The mobile communication device 1 is a device that performs mobile communication and specifically corresponds to a mobile phone or a similar device. An eSIM (subscriber authentication module) necessary for performing mobile communication is attached to the mobile communication device 1. Since mobile communication can be performed by thus attaching an eSIM, the mobile communication device 1 is not limited to a mobile phone and may be a device other than a mobile phone, for example, such as construction heavy equipment or a copier. The eSIM attached to the mobile communication device 1 is rewritable by remote control. Specifically, an Operational Profile (OP, first connection information) and a Provisioning Profile (PP, second connection information) can be written into and deleted from (or disabled in) the eSIM attached to the mobile communication device 1, by remote control.

Here, the OP is information necessary for performing mobile communication over a mobile communication network 4. The OP includes a telephone number and an international mobile subscriber identity (IMSI), which are contract information provided by a mobile communication carrier. The mobile communication device 1 can perform mobile communication over the corresponding mobile communication network 4 by using the OP stored in the eSIM. Here, "the corresponding mobile communication network 4" specifically refers to the mobile communication network 4 managed and operated by the mobile communication carrier that provides the contract information such as the telephone number included in the OP. There are two or more mobile communication networks 4, and the mobile communication device 1 can perform mobile communication in each mobile communication network 4 by using an OP corresponding to the mobile communication network 4 and stored in the eSIM 11. The eSIM 11 generally stores an OP corresponding to one or a particular number of mobile communication networks 4. Mobile communication cannot be performed with a mobile communication network 4 corresponding to an OP that is not stored in the eSIM 11. OPs are managed by a server (in the present embodiment, the transition control device 2) managed by a mobile communication carrier and distributed as necessary to the SMs 3 described later.

The PP is information necessary for performing communication between the mobile communication device 1 and the SM 3 described later. The PP includes an authentication key between the mobile communication device 1 and the SM 3. The mobile communication device 1 can perform communication with the corresponding SM 3 by using the PP stored in the eSIM. Here, the "corresponding SM 3" specifically refers to the SM 3 with which communication can be performed using the authentication key included in the PP. There are two or more SMs 3, and the respective authentication keys between SMs 3 and the mobile communication device 1 are basically different. Since the mobile communication device 1 is in a one-to-one relation with one of the SMs 3, communication with each SM 3 cannot be performed without using the PP including the authentication key corresponding to the SM 3. The mobile communication device 1 performs communication with the SM 3 using the PP stored in the eSIM, acquires an OP from the SM 3 through the communication, and stores the acquired OP in the eSIM to perform mobile communication in the corresponding mobile communication network 4 using the OP. In the foregoing description, the authentication key between the mobile communication device 1 and the SM 3 is included in the PP. However, the present invention is not limited thereto. For example, the authentication key between the mobile communication device 1 and the SM 3 may not be included in the PP, and the process may be performed in the same manner by transmitting and receiving the PP and the authentication key in a set when the PP is transmitted and received.

The transition control device 2 is a server device managed by a mobile communication carrier. The transition control device 2 controls a transition between mobile communication networks 4 described later over which the mobile communication device 1 performs mobile communication. Specifically, in FIG. 1, the transition control device 2 controls the transition of the mobile communication device 1 so that the mobile communication device 1 performing mobile communication in a mobile communication network 4a can perform mobile communication in a mobile communication network 4b different from the mobile communication network 4a. In the present embodiment, it is assumed that a mobile communication carrier A manages the transition control device 2.

The SM 3 is a connection information management server provided corresponding to a mobile communication network 4 for managing connection information required for the mobile communication device 1 to perform mobile communication in the mobile communication network 4. Specifically, the SM 3 stores and manages an OP provided as connection information by each mobile communication carrier. Mobile communication networks 4 for which each SM 3 manages OPs are predetermined, and the SM 3 is connected to such mobile communication networks 4. Connection between the SM 3 and the mobile communication network 4 may be performed through a server device that integrates the mobile communication networks 4 (for example, provided by a carrier managing the SM 3 or a carrier in partnership therewith). The SM 3 establishes communication with the mobile communication device 1 and instructs the mobile communication device 1 to write, delete, or disable the OP. For example, the SM 3 is managed and operated by a business entity or group (for example, an eSIM manufacturer and seller) that is not a mobile communication carrier, but may be managed and operated by a specific mobile communication carrier. The communication between the SM 3 and the mobile communication device 1 is performed through the mobile communication network 4 using the PP as described above. The mobile communication device 1 is connected to the mobile communication network 4 during communication with the SM 3 but is permitted to communicate only with the SM 3 and not allowed to use normal mobile communication functions provided by the mobile communication network 4, for example, communication with another mobile communication device 1. The mobile communication network 4 via which the SM 3 and the mobile communication device 1 communicate may be any mobile communication network 4 that is connected to the SM 3 or may be a mobile communication network 4 designated, for example, in the PP. The SM 3 is connected to the transition control device 2 through a network such as a dedicated line and can transmit and receive an OP or other information to and from the transition control device 2. The SM 3 specifically corresponds to a Subscription Manager (SM) in the eSIM standards. In the overall configuration diagram shown in FIG. 1, two connection information management servers, namely, an SM 3a and an SM 3b are present. Different SMs 3 in many cases belong to opposing alliances and often do not flexibly share information with each other (the PP is therefore neither shared nor interchanged among different SMs 3).

The mobile communication network 4 is a network over which the mobile communication device 1 performs mobile communication. When performing mobile communication in the mobile communication network 4, the mobile communication device 1 has to acquire an OP required for communication from the SM 3 corresponding to the mobile communication network 4 and use the acquired OP. In the present embodiment, the mobile communication network 4 in which mobile communication can be performed using the OP stored in the SM 3 is called the mobile communication network 4 belonging to the SM 3. There may be one or more mobile communication networks 4 belonging to an SM 3, and the respective mobile communication networks 4 may be managed by different mobile communication carriers, or some or all of them may be managed by the same mobile communication carrier. In the overall configuration diagram shown in FIG. 1, four mobile communication networks 4 belong to each of the SM 3a and the SM 3b. In the present embodiment, it is assumed that the mobile communication carrier A manages a mobile communication network 4a and a mobile communication network 4b.

The overall configuration of the communication system 5 has been described above. In the following description in the present embodiment, as shown in FIG. 1, a situation in which the mobile communication device 1 makes a transition from the source mobile communication network 4a to the destination mobile communication network 4b is assumed. The transition here refers to that the OP stored in the eSIM 11 for use in mobile communication by the mobile communication device 1 is changed from the one for the mobile communication network 4a to the one for the mobile communication network 4b. The SM 3a corresponding to the source mobile communication network 4a and the SM 3b corresponding to the destination mobile communication network 4b are different from each other. In this case, neither the OP for the mobile communication network 4b nor the PP for communicating with the SM 3b is stored in the eSIM 11.

As a specific example of this situation, the mobile communication carrier A provides the mobile communication network 4a, the same mobile communication carrier A provides the mobile communication network 4b having different functions from those of the mobile communication network 4a, and the user of the mobile communication device 1 using the mobile communication network 4a wishes to use the mobile communication network 4b. As another specific example, a service provision area M of the mobile communication network 4a and a service provision area N of the mobile communication network 4b are physically distant from each other (for example, different countries), and the user of the mobile communication device 1 wishes to receive the services provided by the mobile communication carrier A even in the destination service provision area N when moving from the service provision area M to the service provision area N.

Figure 2:
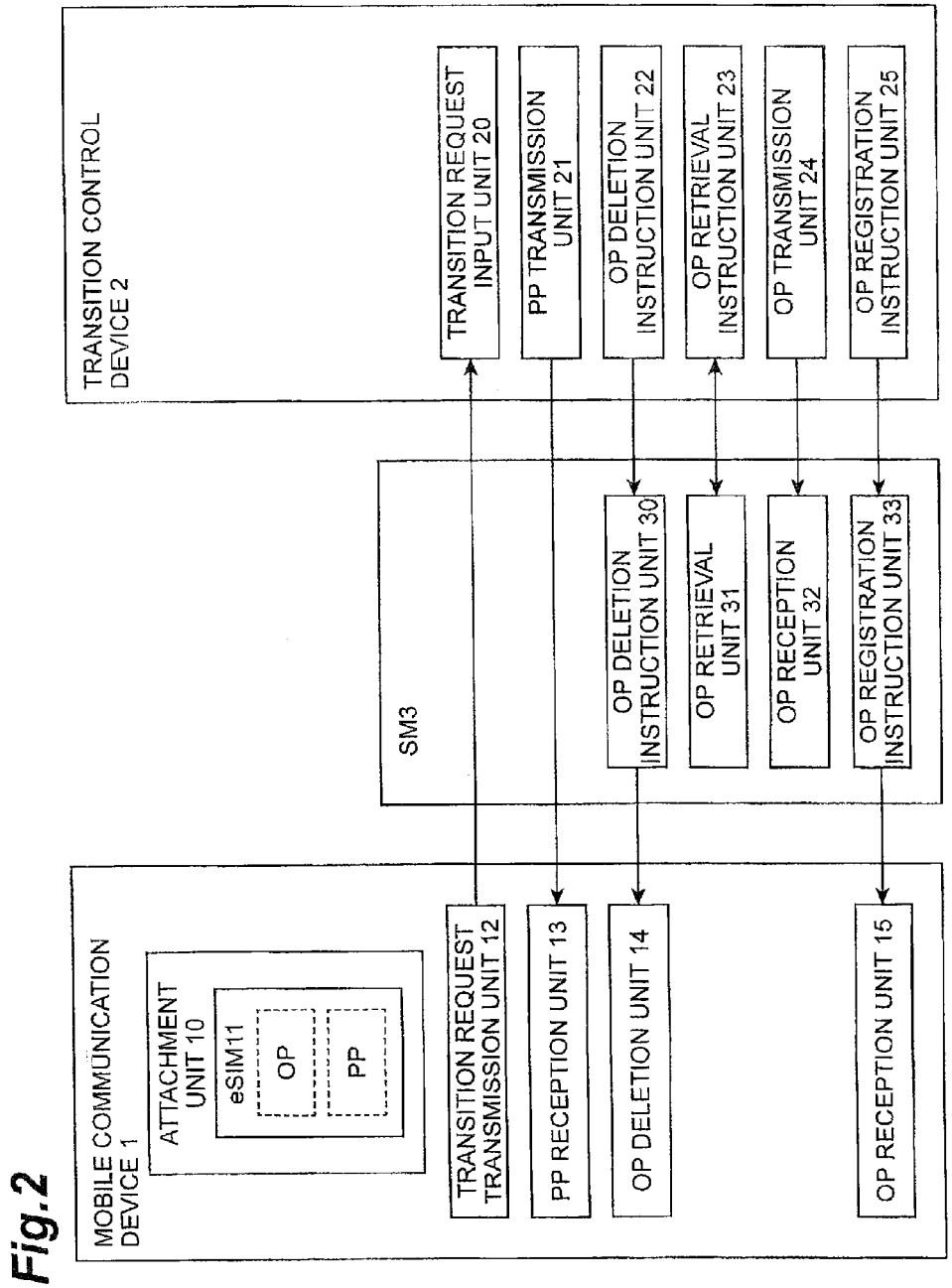
FIG. 2 is a functional block diagram of a mobile communication device, a transition control device, and a connection information management server in the embodiment of the present invention.

The functional configuration of the mobile communication device 1, the transition control device 2, and the SM 3 will now be described. FIG. 2 is a functional block diagram showing a configuration of the mobile communication device 1, the transition control device 2, and the SM 3 according to the present embodiment. As shown in FIG. 2, the mobile communication device 1 is configured to include an attachment unit 10 (attachment means), an eSIM 11, a transition request transmission unit 12 (transition request transmission means), a PP reception unit 13 (first reception means), an OP deletion unit 14 (connection information deletion means), and an OP reception unit 15 (second reception means). The transition control device 2 is configured to include a transition request input unit 20 (transition request input means), a PP transmission unit 21 (first transmission means), an OP deletion instruction unit 22, an OP retrieval instruction unit 23, an OP transmission unit 24 (second transmission means), and an OP registration instruction unit 25. The SM 3 is configured to include an OP deletion instruction unit 30, an OP retrieval unit 31, an OP reception unit 32, and an OP registration instruction unit 33.

Before the respective configurations of the mobile communication device 1, the transition control device 2, and the SM 3 are described, the overview of the procedure of a process performed when the mobile communication device 1 makes a transition from the source mobile communication network 4a to the destination mobile communication network 4b will be described briefly. To make a transition to the mobile communication network 4b, the mobile communication device 1 performing mobile communication using the OP for the mobile communication network 4a, first, receives the PP for the mobile communication network 4b through the current mobile communication network 4a. The mobile communication device 1 then deletes (or disables) the OP for the mobile communication network 4a, communicates with the SM 3b using the received PP for the mobile communication network 4b to receive the OP for the mobile communication network 4b from the SM 3b, and performs mobile communication over the mobile communication network 4b using the received OP for the mobile communication network 4b.

First, the configuration of the mobile communication device 1 will be described.

The attachment unit 10 is means for attaching thereto the eSIM 11 described later. The attachment unit 10 may attach the eSIM 11 with a removable mechanism that allows the eSIM 11 to be physically detached or may attach the eSIM 11 with an irremovable mechanism that does not allow the eSIM 11 to be physically detached, for example, by embedding the eSIM 11 in the mobile communication device 1.

The eSIM 11 is a subscriber authentication module which is rewritable by remote control. The eSIM 11 stores an OP corresponding to a mobile communication network 4 and necessary for performing mobile communication over the mobile communication network 4 and a PP necessary for performing communication with an SM 3 provided corresponding to a mobile communication network 4 and configured to perform rewrite control on the OP. The PP is provided by a mobile communication carrier, and the communication using the PP uses a mobile communication network 4 provided by the mobile communication carrier.

The transition request transmission unit 12 is means for transmitting, to the transition control device 2, a transition request that is information about a request for transition between mobile communication networks 4 over which the mobile communication device 1 performs mobile communication. The transition request transmitted by the transition request transmission unit 12 includes, for example, the identification information (number) of the eSIM 11 attached to the mobile communication device 1 as the transition subject, the identification information of a source mobile communication network 4, and the identification information of a destination mobile communication network 4. The information included in the transition request may be stored in the mobile communication device 1 in advance or may be input as necessary by the user of the mobile communication device 1. The transition request transmitted by the transition request transmission unit 12 may be created through designation by the user of the mobile communication device 1 or may be created by the mobile communication device 1 or an application or the like activated in the mobile communication device 1. To determine to which transition control device 2 a transition request is transmitted, for example, the transition request transmission unit 12 refers to the OP or other data to specify the mobile communication carrier that manages the mobile communication network 4 over which the mobile communication device 1 is currently performing mobile communication, and then determines the transmission destination by referring to a destination list of transition control devices 2 for each mobile communication carrier that is stored in the mobile communication device 1 in advance. The transition request transmission unit 12 transmits a transition request to the transition request input unit 20 of the transition control device 2 described later through the mobile communication network 4 over which the mobile communication device 1 is currently performing mobile communication.

The PP reception unit 13 receives, through the mobile communication network 4 associated with the OP stored in the eSIM 11 attached by the attachment unit 10, the PP associated with the SM 3 corresponding to a destination mobile communication network 4 different from the mobile communication network 4, and stores the received PP in the eSIM 11. A specific description will be given based on the example in the configuration diagram in FIG. 1. The PP reception unit 13 receives the PP associated with the SM 3b corresponding to the destination mobile communication network 4b, through the mobile communication network 4a associated with the OP stored in the eSIM 11 attached by the attachment unit 10, and stores the received PP in the eSIM 11. The sender of the PP received by the PP reception unit 13 is the PP transmission unit 21 of the transition control device 2 described later. The PP reception unit 13 may receive the PP as a response to the transition request transmitted by the transition request transmission unit 12. At a point of time when the PP reception unit 13 receives the PP, the PP is in an inactive state (a state in which communication with the SM 3 using the PP cannot be performed). After the reception, the PP reception unit 13 changes the state of the PP into an active state (a state in which communication with the SM 3 using the PP can be performed). In a state in which the OP for the mobile communication network 4a belonging to the SM 3a is stored (active state), the PP for the SM 3b different from the SM 3a may not be able to be stored in an area in which a PP is usually stored. In this case, the PP associated with the SM 3b may be contained in profile information stored in an area (free area) in the eSIM 11 that is freely readable and writable by the mobile communication carrier. When storing the PP associated with the SM 3b corresponding to the destination mobile communication network 4b in the eSIM 11, the PP reception unit 13 may delete the PP associated with the SM 3a corresponding to the source mobile communication network 4a that has already been stored in the eSIM 11, or may store the disabled PP.

The OP deletion unit 14 is means for receiving a deletion instruction, which is information to give an instruction to delete the OP stored in the eSIM 11, and deleting the OP. The OP deletion unit 14 receives a deletion instruction transmitted from the OP deletion instruction unit 30 of the SM 3 that is the sender of the OP, through the mobile communication network 4 associated with the OP stored in the eSIM 11. The OP deletion unit 14 may store the disabled OP without actually deleting the OP.

The OP reception unit 15 is means for performing communication with the SM 3 corresponding to a destination mobile communication network 4 using the PP received by the PP reception unit 13 and stored in the eSIM 11 attached by the attachment unit 10, to receive the PP associated with the destination mobile communication network 4, and storing the received PP in the eSIM 11. A specific description will be given based on the example in the configuration diagram in FIG. 1. The OP reception unit 15 performs communication with the SM 3b using the PP stored in the eSIM 11 for connecting to the SM 3b to receive the PP associated with the mobile communication network 4b, and stores the received PP in the eSIM 11. This enables the mobile communication device 1 to perform mobile communication in the mobile communication network 4b using the PP associated with the mobile communication network 4b that is stored in the eSIM 11.

The configuration of the mobile communication device 1 has been described above. Next, each component of the transition control device 2 will be described.

The transition request input unit 20 is means for inputting a transition request to make a transition between mobile communication networks 4 over which the mobile communication device 1 performs mobile communication. The transition request input unit 20 may input a transition request designated, for example, by the administrator of the transition control device 2 or may input a transition request transmitted from the transition request transmission unit 12 of the mobile communication device 1 or an external server. In the present embodiment, it is assumed that the transition request input unit 20 inputs a transition request transmitted from the transition request transmission unit 12 of the mobile communication device 1. In this case, the transition request input unit 20 inputs a transition request through the mobile communication network 4 over which the mobile communication device 1 is currently performing mobile communication and that is used when the transition request transmission unit 12 of the mobile communication device 1 transmits the transition request. The information included in the transition request input by the transition request input unit 20, specifically, information including the identification information of the eSIM 11 attached to the mobile communication device 1 as the transition subject, the identification information of the source mobile communication network 4, and the identification information of the destination mobile communication network 4, is stored in the transition control device 2 and is referred to as necessary in the subsequent process in each component included in the transition control device 2 and used to specify the eSIM 11, the source mobile communication network 4, and the destination mobile communication network 4. These pieces of information are included as necessary in information to be transmitted to or received from the SM 3 or a similar device, so that the eSIM 11, the source mobile communication network 4, and the destination mobile communication network 4 are specified in the SM 3 similarly. If there is information that can be specified, for example, based on communication between the transition control device 2 and the mobile communication device 1 (for example, the source mobile communication network 4), the information may not be included in the transition request. The transition control device 2 has information on the correspondence between the mobile communication networks 4 and the SMs 3, so that the SM 3 corresponding to a mobile communication network 4 can be specified based on the mobile communication network 4. Alternatively, the identification information of the respective SMs 3 corresponding to the source mobile communication network 4 and the destination mobile communication network 4 may be included in the transition request, so that the respective SMs 3 can be specified from the identification information.

The PP transmission unit 21 transmits the PP associated with the SM 3 corresponding to the destination mobile communication network 4, to the mobile communication device 1 (the eSIM 11) that is the sender of the transition request input by the transition request input unit 20, through the source mobile communication network 4. A specific description will be given based on the example in the configuration diagram in FIG. 1. The PP transmission unit 21 transmits the PP associated with the SM 3b corresponding to the mobile communication network 4b to the mobile communication device 1 (the eSIM 11) through the mobile communication network 4a. The PP associated with the SM 3b that is transmitted by the PP transmission unit 21 is, for example, one of the PPs stored for the respective SMs 3 in the transition control device 2 in advance and is determined as such by the PP transmission unit 21 based on the SM 3 corresponding to the destination mobile communication network 4 specified by the transition request input unit 20.

The OP deletion instruction unit 22 is means for transmitting a deletion instruction that is instruction information to delete the OP stored in the eSIM 11 of the mobile communication device 1 and corresponding to the source mobile communication network 4a. The OP deletion instruction unit 22 transmits a deletion instruction after determining that the PP transmitted by the PP transmission unit 21 is received by the PP reception unit 13 of the mobile communication device 1 and stored in the eSIM 11 of the mobile communication device 1 (for example, ACK indicating successful completion of the storage is received from the mobile communication device 1). The OP deletion instruction unit 22 transmits a deletion instruction to the OP deletion instruction unit 30 of the SM 3 (SM 3a) described later. The OP deletion instruction unit 22 transmits a deletion instruction to the mobile communication device 1 (the eSIM 11) that is the destination of the PP transmitted by the PP transmission unit 21.

The OP retrieval instruction unit 23 is means for transmitting, to the OP retrieval unit 31 of the SM 3 described later, a retrieval instruction that is instruction information to retrieve the OP corresponding to the source mobile communication network 4a for the eSIM 11 managed by the SM 3, at the transition control device 2. The retrieval instruction transmitted by the OP retrieval instruction unit 23 includes the identification information of the OP to be retrieved or the identification information of the eSIM 11. The OP retrieval instruction unit 23 receives the OP from the SM 3 as a response to transmission of the retrieval instruction and stores the received OP in the transition control device 2.

The OP transmission unit 24 is means for generating the OP associated with the destination mobile communication network 4 for the mobile communication device 1 (the eSIM 11) associated with the transition request input by the transition request input unit 20, and transmitting the generated OP to the SM 3 corresponding to the destination mobile communication network 4. A specific description will be given based on the example in the configuration diagram in FIG. 1. The OP transmission unit 24 generates the OP for the eSIM 11 associated with the mobile communication network 4b and transmits the generated OP to the SM 3b. The OP transmission unit 24 generates the OP associated with the mobile communication network 4 based on the OP stored by the OP retrieval instruction unit 23 in the transition control device 2. The OP transmission unit 24 transmits the generated OP to the OP reception unit 32 of the SM 3 described later. The OP is generated using a conventional technique.

The OP registration instruction unit 25 is means for transmitting a registration instruction that is instruction information to register an OP stored in the SM 3 to the eSIM 11 of the mobile communication device 1 (to store the OP in the eSIM 11). Specifically, the OP registration instruction unit 25 transmits a registration instruction to register an OP to the OP registration instruction unit 33 described later in the SM 3 that has received the OP transmitted by the OP transmission unit 24. The registration instruction includes the identification information of the eSIM 11 of the mobile communication device 1 in which the OP is to be registered and the identification information of the OP to be registered. The OP registration instruction unit 25 determines the mobile communication device 1 included in the registration instruction as a registration destination, based on the identification information of the eSIM 11 that is included in the transition request input by the transition request input unit 20.

The configuration of the transition control device 2 has been described above. The transition control device 2 may include a controller (not shown) that performs some of processing in the above described configuration as proxy. Next, each component in the SM 3 will be described.

The OP deletion instruction unit 30 receives the deletion instruction transmitted by the OP deletion instruction unit 22 of the transition control device 2, determines the mobile communication device 1 as a destination based on the identification information of the eSIM 11 that is included in the received deletion instruction, and transmits the received deletion instruction to the OP deletion unit 14 of the mobile communication device 1.

The OP retrieval unit 31 is means for receiving the retrieval instruction transmitted by the OP retrieval instruction unit 23 of the transition control device 2, deleting an OP indicated by the identification information of the OP that is included in the received retrieval instruction or the OP corresponding to the identification information of the eSIM 11 that is included in the received retrieval instruction, from a storage unit (not shown) of the SM 3 storing and managing OPs, and transmitting the OP to the transition control device 2 that is the sender of the retrieval instruction. A correspondence table between the identification information of an eSIM 11 and the OP stored in the eSIM 11 is stored in the SM 3, so that the OP retrieval unit 31 can extract the corresponding OP based on the identification formation of the eSIM 11 by referring to the correspondence table.

The OP reception unit 32 is means for receiving an OP transmitted from the OP transmission unit 24 of the transition control device 2 and storing the received OP in the aforementioned storage unit of the SM 3.

The OP registration instruction unit 33 receives the registration instruction transmitted from the OP registration instruction unit 25 of the transition control device 2, acquires an OP corresponding to the identification information of the OP that is included in the registration instruction from the aforementioned storage unit, and transmits the acquired OP to the OP reception unit 15 of the mobile communication device 1 corresponding to the identification information of the eSIM 11 that is included in the registration instruction.

The configuration of the SM 3 has been described above. Next, the hardware configurations of the mobile communication device 1, the transition control device 2, and the SM 3 will be described.

Figure 3:
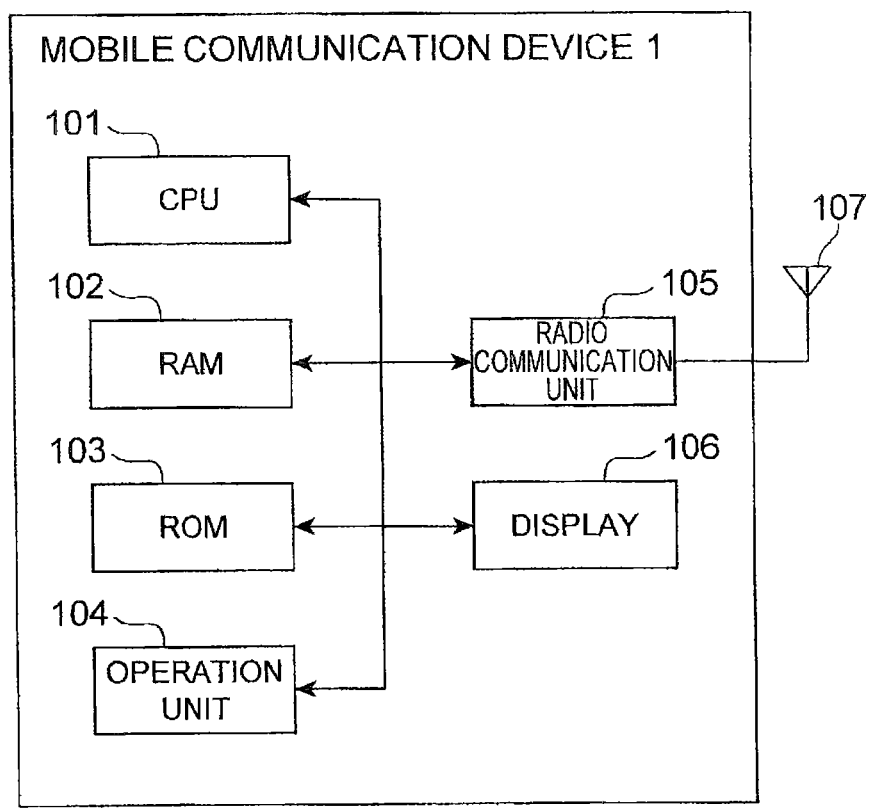
FIG. 3 is a diagram showing a hardware configuration of the mobile communication device according to the embodiment of the present invention.

FIG. 3 shows a hardware configuration of the mobile communication device 1. As shown in FIG. 3, the mobile communication device 1 is configured with hardware including a CPU (central processing unit) 101, a RAM (random access memory) 102 and a ROM (read only memory) 103 as main storage devices, an operation unit 104 as an input device, a radio communication unit 105 as a data transmission/reception device, a display 106 as an output device, and an antenna 107. The mobile communication device 1 also includes the attachment unit 10 and the eSIM 11 as hardware as described above. The display 106 is not an essential component. These components operate to fulfill the function of each component in the mobile communication device 1 shown in FIG. 2.

Figure 4:
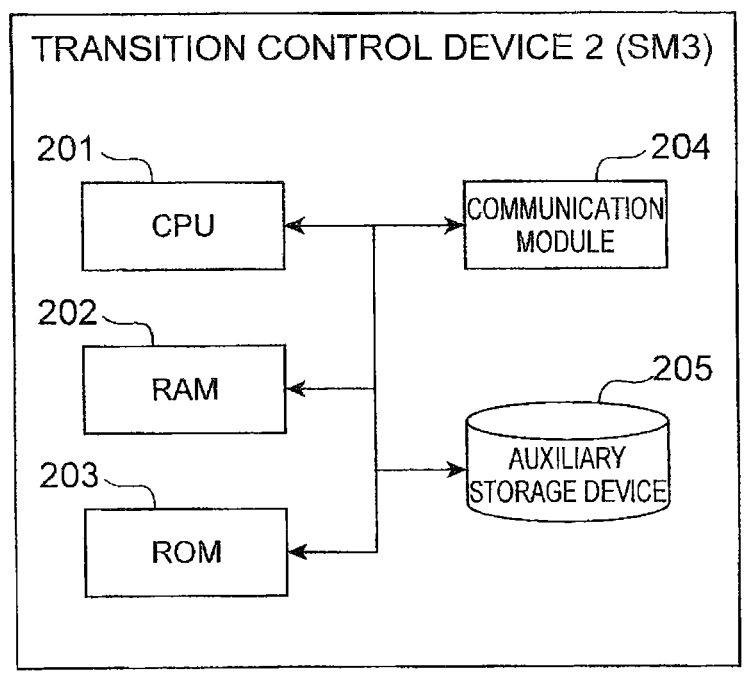
FIG. 4 is a diagram showing hardware configurations of the transition control device and the connection information management server according to the embodiment of the present invention.

FIG. 4 shows a hardware configuration of the transition control device 2. As shown in FIG. 4, the transition control device 2 and the SM 3 are each configured with hardware including a CPU 201, a RAM 202 and a ROM 203 as main storage devices, a communication module 204 as a data transmission/reception device, and an auxiliary storage device 205 as a storage device. These components operate to fulfill the function of each component in the transition control device 2 and the SM 3 shown in FIG. 2.

The hardware configuration of the SM 3 is similar to the hardware configuration of the transition control device 2 shown in FIG. 4, and a description thereof is omitted. The hardware components operate to fulfill the function of each component in the SM 3 shown in FIG. 2 in the same manner as in the transition control device 2.

Figure 5:
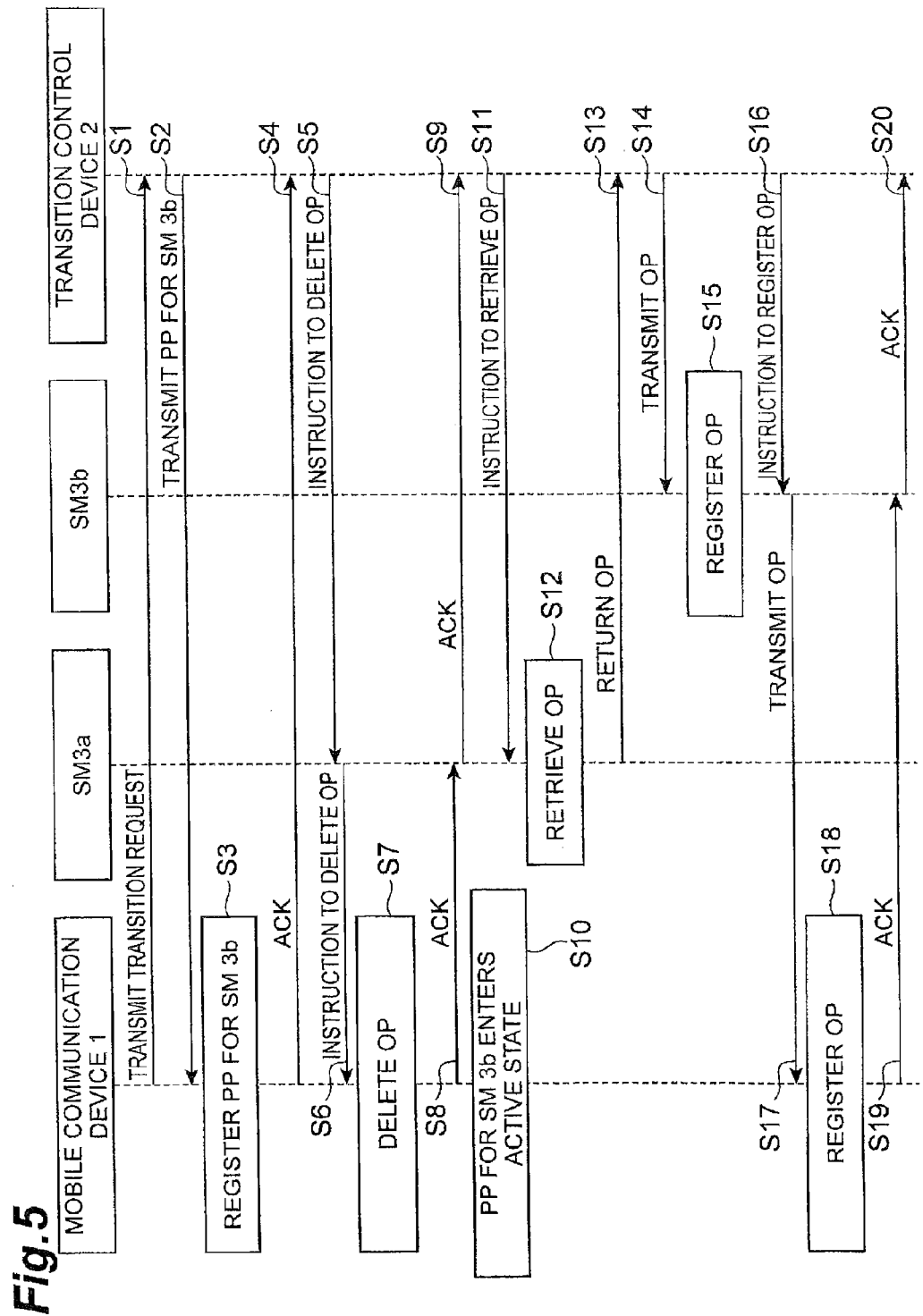
FIG. 5 is a flowchart showing a process (transition control method) performed in the communication system according to the embodiment of the present invention.

Next, the process (transition control method) performed in the communication system 5 according to the present embodiment will be described with reference to the sequence diagram in FIG. 5. The sequence shown in FIG. 5 proceeds on the premise of a situation in which, in the overall configuration diagram shown in FIG. 1, the OP for the mobile communication network 4a is stored in the eSIM 11 of the mobile communication device 1, and the mobile communication device 1 is performing mobile communication over the mobile communication network 4a using the OP and makes a transition from this to the mobile communication network 4b.

First, a request for transition to the mobile communication network 4b is transmitted by the transition request transmission unit 12 of the mobile communication device 1 to the transition control device 2, and the transmitted transition request is input (received) by the transition request input unit 20 of the transition control device 2 (S1, transition request input step). Next, the PP for the SM 3b corresponding to the mobile communication network 4b that is a transition destination of the mobile communication device 1 is transmitted by the PP transmission unit 21 to the mobile communication device 1 (first transmission step). The transmitted PP for the SM 3b is received by the PP reception unit 13 of the mobile communication device 1 (S2, first reception step). Next, the received PP for the SM 3b is stored (registered) in the eSIM 11 by the PP reception unit 13 of the mobile communication device 1 (S3). When the registration of the PP for the SM 3b is completed in S3, ACK indicating completion of the registration is transmitted by the PP reception unit 13 to the transition control device 2 (S4).

Next, an instruction to delete the OP for the mobile communication network 4a that is stored in the eSIM 11 of the mobile communication device 1 is transmitted by the OP deletion instruction unit 22 of the transition control device 2 to the SM 3a (S5). The deletion instruction is transmitted by the OP deletion instruction unit 30 of the SM 3a to the OP deletion unit 14 of the mobile communication device 1 (S6). The OP for the mobile communication network 4a that is designated by the received deletion instruction is deleted by the OP deletion unit 14 of the mobile communication device 1 from the eSIM 11 (S7). When the deletion of the OP for the mobile communication network 4a is completed in S7, ACK indicating completion of the deletion is transmitted by the OP deletion unit 14 to the transition control device 2 through the SM 3a (S8 and S9). When the deletion of the OP for the mobile communication network 4a is completed in S7, the PP for the SM 3b that is registered in S3 enters an active state in the eSIM 11 of the mobile communication device 1, thereby enabling communication with the SM 3b (S10).

Next, an instruction to retrieve the OP for the mobile communication network 4a is transmitted by the OP retrieval instruction unit 23 of the transition control device 2 to the SM 3a (S11). The transmitted retrieval instruction is received by the OP retrieval unit 31 of the SM 3a, and the OP for the mobile communication network 4a that is stored in the storage unit of the SM 3a is retrieved by the OP retrieval unit 31 of the SM 3a (S12) and transmitted to the transition control device 2. The transmitted OP for the mobile communication network 4a is received by the OP retrieval instruction unit 23 of the transition control device 2 (S13). Next, the OP for the mobile communication network 4b is generated based on the OP for the mobile communication network 4a that is received in S13, and transmitted by the OP transmission unit 24 of the transition control device 2 to the SM 3b (S14, second transmission step). Next, the OP reception unit 32 of the SM 3b receives the transmitted OP for the mobile communication network 4b and stores (registers) the received OP in the storage unit of the SM 3b (S15).

Next, an instruction to register the OP for the mobile communication network 4b is transmitted by the OP registration instruction unit 25 of the transition control device 2 to the SM 3b (S16). Next, the registration instruction transmitted in S16 is received by the OP registration instruction unit 33 of the SM 3b, and the OP for the mobile communication network 4b is acquired from the storage unit based on the registration instruction and transmitted to the mobile communication device 1 (S17). Next, the OP for the mobile communication network 4b that is transmitted in S17 is received by the OP reception unit 15 of the mobile communication device 1 and stored (registered) in the eSIM 11 of the mobile communication device 1 (S18, second reception step). When the registration of the OP for the mobile communication network 4b is completed in S18, ACK indicating completion of the registration is transmitted by the OP reception unit 15 to the transition control device 2 through the SM 3b (S19 and S20). The sequence shown in FIG. 5 has been described above.

As described above, in the present embodiment, based on a transition request, the PP reception unit 13 of the mobile communication device 1 receives, through the mobile communication network 4a associated with the OP stored in the eSIM 11 attached by the attachment unit 10, the PP associated with the SM 3b corresponding to the destination mobile communication network 4b different from the mobile communication network 4a, and stores the received PP in the eSIM 11. The OP reception unit 15 of the mobile communication device 1 then performs communication with the SM 3b using the PP to receive the OP associated with the destination mobile communication network 4b, and stores the received OP in the eSIM 11. That is, the mobile communication device 1 acquires the PP for performing communication with the SM 3b corresponding to the destination mobile communication network 4b in advance through the source mobile communication network 4a and performs communication with the corresponding SM 3b using the PP to receive the OP for performing mobile communication over the destination mobile communication network 4b. This enables the mobile communication device 1 to perform mobile communication over the destination mobile communication network 4b. As described above, the SM swap can be performed more efficiently without any special intervention by the user.

The mobile communication device 1 may further include the transition request transmission unit 12 that transmits a transition request to make a transition between mobile communication networks 4 over which mobile communication is performed. The transition request input unit 20 of the transition control device 2 may input the transition request transmitted by the transition request transmission unit 12 of the mobile communication device 1. This configuration enables a transition based on the transition request from the mobile communication device 1 side, so that a transition can be performed at the timing desired by the mobile communication device 1 side.

The mobile communication device 1 may further include the OP deletion unit 14 that deletes the OP stored in the eSIM 11 attached by the attachment unit 10. This configuration ensures that the OP will be deleted, for example, when mobile communication over the mobile communication network 4 associated with the OP becomes unnecessary.

Figure 6:
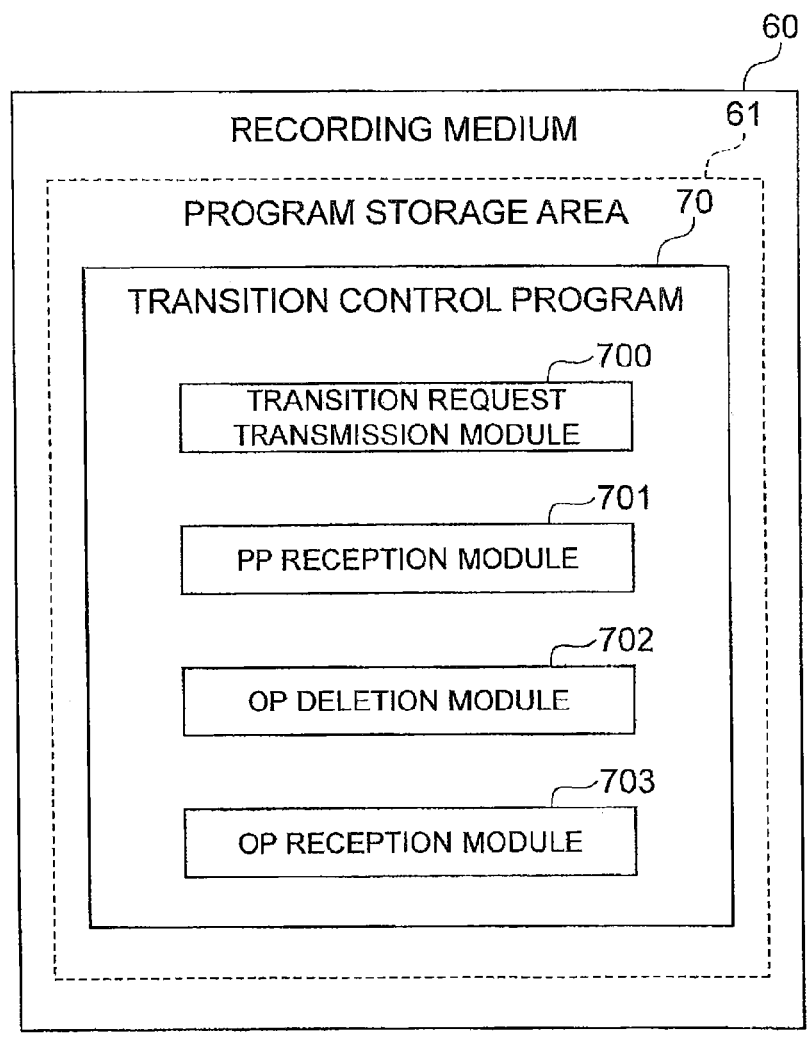
FIG. 6 is a diagram showing a configuration of a transition control program according to the embodiment of the present invention with a recording medium.

A transition control program 70 for allowing a computer to perform a series of processes by the mobile communication device 1 as described above will now be described. As shown in FIG. 6, the transition control program 70 is stored in a program storage area 61 formed in a recording medium 60 inserted into and accessed by a computer or included in a computer. More specifically, the transition control program 70 is stored in the program storage area 61 formed in the recording medium 60 of the mobile communication device 1.

The transition control program 70 is configured to include a transition request transmission module 700, a PP reception module 701, an OP deletion module 702, and an OP reception module 703. The functions implemented by executing the transition request transmission module 700, the PP reception module 701, the OP deletion module 702, and the OP reception module 703 are similar to the functions of the transition request transmission unit 12, the PP reception unit 13, the OP deletion unit 14, and the OP reception unit 15, respectively, of the mobile communication device 1 described above.

The transition control program 70 may be partially or entirely transmitted through a transmission medium such as a communication line and received by another device for registration (including installation). Each module of the transition control program 70 may be installed in any one of a plurality of computers rather than in the same single computer as the other modules. In this case, a series of processes of the transition control program 70 as described above is performed by a computer system including the plurality of computers.

Figure 7:
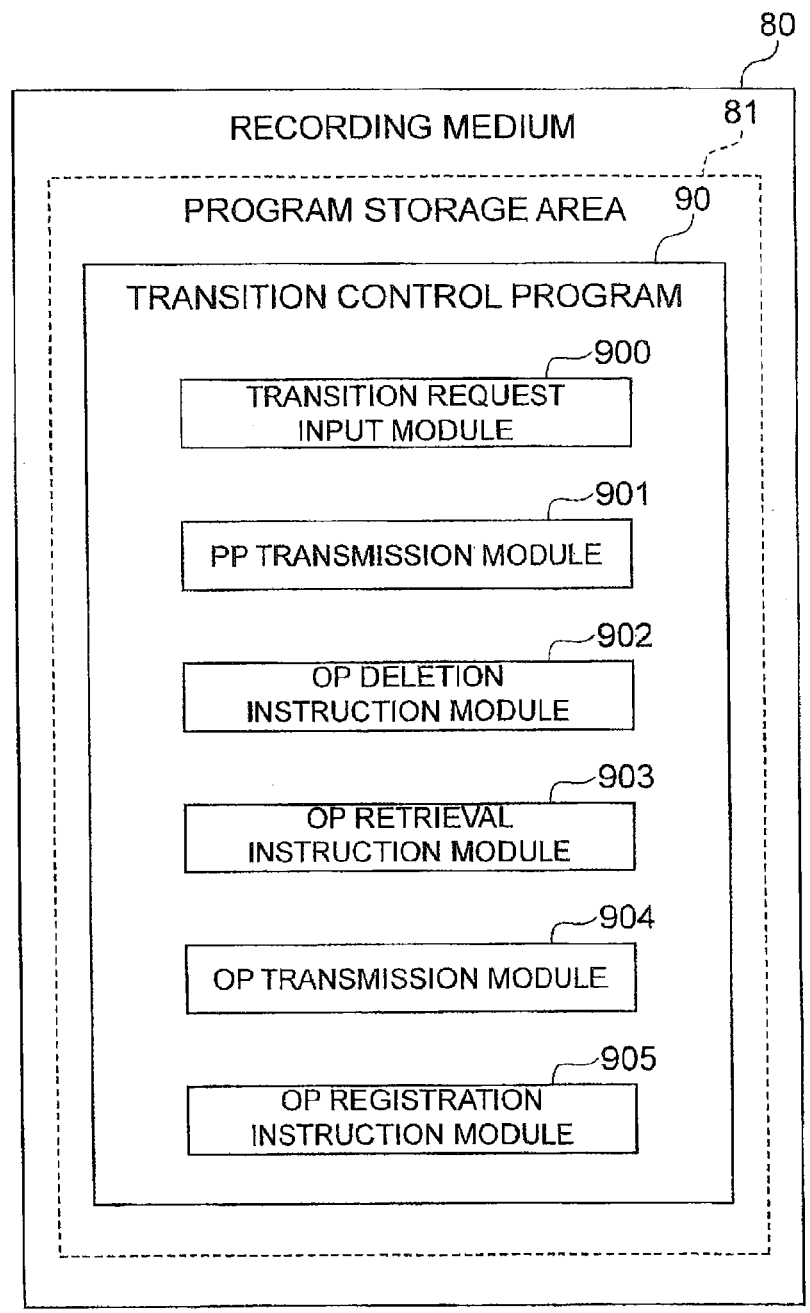
FIG. 7 is a diagram showing a configuration of a transition control program according to the embodiment of the present invention with a recording medium.

A transition control program 90 for allowing a computer to perform a series of processes by the transition control device 2 described above will now be described. As shown in FIG. 7, the transition control program 90 is stored in a program storage area 81 formed in a recording medium 80 inserted into and accessed by a computer or included in a computer.

The transition control program 90 is configured to include a transition request input module 900, a PP transmission module 901, an OP deletion instruction module 902, an OP retrieval instruction module 903, an OP transmission module 904, and an OP registration instruction module 905. The functions implemented by executing the transition request input module 900, the PP transmission module 901, the OP deletion instruction module 902, the OP retrieval instruction module 903, the OP transmission module 904, and the OP registration instruction module 905 are similar to the functions of the transition request input unit 20, the PP transmission unit 21, the OP deletion instruction unit 22, the OP retrieval instruction unit 23, the OP transmission unit 24, and the OP registration instruction unit 25, respectively, of the transition control device 2 described above.

The transition control program 90 may be partially or entirely transmitted through a transmission medium such as a communication line and received by another device for registration (including installation). Each module of the transition control program 90 may be installed in any one of a plurality of computers rather than in the same single computer as the other modules. In this case, a series of processes of the transition control program 90 described above is performed by a computer system including the plurality of computers.

REFERENCE SIGNS LIST

1 . . . mobile communication device, 10 . . . attachment unit, 11 . . . eSIM, 12 . . . transition request transmission unit, 13 . . . PP reception unit, 14 . . . OP deletion unit, 15 . . . OP reception unit, 2 . . . transition control device, 20 . . . transition request input unit, 21 . . . PP transmission unit, 22 . . . OP deletion instruction unit, 23 . . . OP retrieval instruction unit, 24 . . . OP transmission unit, 25 . . . OP registration instruction unit, 3, 3a, 3b . . . SM, 30 . . . OP deletion instruction unit, 31 . . . OP retrieval unit, 32 . . . OP reception unit, 33 . . . OP registration instruction unit, 4, 4a, 4b . . . mobile communication network, 5 . . . communication system, 60 . . . recording medium, 61 . . . program storage area, 70 . . . transition control program, 80 . . . recording medium, 81 . . . program storage area, 90 . . . transition control program.

The invention claimed is:

1. A communication system including a mobile communication device that performs mobile communication and a transition control device that controls a transition between mobile communication networks over which the mobile communication device performs mobile communication, the mobile communication device comprising:
an attachment unit for attaching thereto a subscriber authentication module that stores therein first connection information and second connection information, the first connection information corresponding to a mobile communication network and being necessary for performing mobile communication over the mobile communication network, the second connection information being necessary for performing communication with a connection information management server provided corresponding to a mobile communication network and configured to perform rewrite control on the first connection information; and circuitry configured to receive, through a mobile communication network associated with the first connection information stored in the subscriber authentication module attached by the attachment unit, the second connection information associated with a connection information management server corresponding to a destination mobile communication network different from the mobile communication network, and store the received second connection information in the subscriber authentication module; and perform communication directly with the connection information management server corresponding to the destination mobile communication network, using the received second connection information and stored in the subscriber authentication module attached by the attachment unit, to receive the first connection information associated with the destination mobile communication network, and store the received first connection information in the subscriber authentication module, the transition control device comprising:

circuitry configured to input a transition request to make a transition between mobile communication networks over which the mobile communication device performs mobile communication;

transmit the second connection information associated with the connection information management server corresponding to the destination mobile communication network, to the mobile communication device associated with the transition request input, through a source mobile communication network; and generate the first connection information associated with the destination mobile communication network for the mobile communication device associated with the transition request input, and transmit the generated first connection information to the connection information management server corresponding to the destination mobile communication network.

2. The communication system according to claim 1, wherein the circuitry of the mobile communication device is further configured to transmit a transition request to make a transition between mobile communication networks over which mobile communication is performed, and the circuitry of the transition control device inputs the transmitted transition request.

3. The communication system according to claim 1, wherein the circuitry of the mobile communication device is further configured to delete the first connection information stored in the subscriber authentication module attached by the attachment unit.

4. A mobile communication device that performs mobile communication, comprising:

an attachment unit for attaching thereto a subscriber authentication module that stores therein first connection information and second connection information, the first connection information corresponding to a mobile communication network and being necessary for performing mobile communication over the mobile communication network, the second connection information being necessary for performing communication with a connection information management server provided corresponding to a mobile communication network and configured to perform rewrite control on the first connection information; and circuitry configured to receive, through a mobile communication network associated with the first connection information stored in the subscriber authentication module attached by the attachment unit, the second connection information associated with a connection information management server corresponding to a destination mobile communication network different from the mobile communication network, and store the received second connection information in the subscriber authentication module; and perform communication directly with the connection information management server corresponding to the destination mobile communication network, using the received second connection information and stored in the subscriber authentication module attached by the attachment unit, to receive the first connection information associated with the destination mobile communication network, and store the received first connection information in the subscriber authentication module.

5. A transition control device comprising:

circuitry configured to input a transition request to make a transition between mobile communication networks over which a mobile communication device performs mobile communication, the mobile communication device including attachment unit for attaching thereto a subscriber authentication module that stores therein first connection information and second connection information, the first connection information corresponding to a mobile communication network and being necessary for performing mobile communication over the mobile communication network, the second connection information being necessary for performing communication with a connection information management server provided corresponding to a mobile communication network and configured to perform rewrite control on the first connection information;

transmit the second connection information associated with a connection information management server corresponding to a destination mobile communication network, to the mobile communication device associated with the transition request input, through a source mobile communication network; and generate the first connection information associated with the destination mobile communication network for the mobile communication device associated with the transition request input, and transmit the generated first connection information directly to the connection information management server corresponding to the destination mobile communication network.

6. A transition control method to be performed in a communication system including a mobile communication device that performs mobile communication and a transition control device that controls a transition between mobile communication networks over which the mobile communication device performs mobile communication, the mobile communication device including an attachment unit for attaching thereto a subscriber authentication module that stores therein first connection information and second connection information, the first connection information corresponding to a mobile communication network and being necessary for performing mobile communication over the mobile communication network, the second connection information being necessary for performing communication with a connection information management server provided corresponding to a mobile communication network and configured to perform rewrite control on the first connection information, the transition control method comprising:

a transition request input step, by the transition control device, of inputting a transition request to make a transition between mobile communication networks over which the mobile communication device performs mobile communication;

a first transmission step, by the transition control device, of transmitting the second connection information associated with a connection information management server corresponding to a destination mobile communication network, to the mobile communication device associated with the transition request input in the transition request input step, through a source mobile communication network;

a first reception step, by the mobile communication device, of receiving the second connection information transmitted in the first transmission step through the source mobile communication network, and storing the
received second connection information in the subscriber authentication module;
a second transmission step, by the transition control device, of generating the first connection information associated with the destination mobile communication network for the mobile communication device associated with the transition request input in the transition request input step, and transmitting the generated first connection information to the connection information management server corresponding to the destination mobile communication network; and
a second reception step, by the mobile communication device, of performing communication directly with the connection information management server corresponding to the destination mobile communication network, using the second connection information received in the first reception step and stored in the subscriber authentication module attached by the attachment unit, to receive the first connection information associated with the destination mobile communication network that is transmitted to the connection information management server in the second transmission step, and storing the received first connection information in the subscriber authentication module.

7. A transition control method to be performed by a mobile communication device that performs mobile communication, the mobile communication device including an attachment unit for attaching thereto a subscriber authentication module that stores therein first connection information and second connection information, the first connection information corresponding to a mobile communication network and being necessary for performing mobile communication over the mobile communication network, the second connection information being necessary for performing communication with a connection information management server provided corresponding to a mobile communication network and configured to perform rewrite control on the first connection information, the transition control method comprising:
a first reception step of receiving, through a mobile communication network associated with the first connection information stored in the subscriber authentication module attached by the attachment unit, the second connection information associated with a connection information management server corresponding to a destination mobile communication network different from the mobile communication network, and storing the received second connection information in the subscriber authentication module; and
a second reception step of performing communication directly with the connection information management server corresponding to the destination mobile communication network, using the second connection information received in the first reception step and stored in the subscriber authentication module attached by the attachment unit, to receive the first connection information associated with the destination mobile communication network, and storing the received first connection information in the subscriber authentication module.

8. A transition control method to be performed by a transition control device that controls a transition between mobile communication networks over which a mobile communication device performs mobile communication, the transition control method comprising:
a transition request input step of inputting a transition request to make a transition between mobile communication networks over which a mobile communication device performs mobile communication, the mobile communication device including an attachment unit for attaching thereto a subscriber authentication module that stores therein first connection information and second connection information, the first connection information corresponding to a mobile communication network and being necessary for performing mobile communication over the mobile communication network, the second connection information being necessary for performing communication with a connection information management server provided corresponding to a mobile communication network and configured to perform rewrite control on the first connection information;
a first transmission step of transmitting the second connection information associated with a connection information management server corresponding to a destination mobile communication network, to the mobile communication device associated with the transition request input in the transition request input step, through a source mobile communication network; and
a second transmission step of generating the first connection information associated with the destination mobile communication network for the mobile communication device associated with the transition request input in the transition request input step, and transmitting the generated first connection information directly to the connection information management server corresponding to the destination mobile communication network.

9. A non-transitory computer readable medium including a transition control program to cause a mobile communication device, where the mobile communication device includes attachment circuitry for attaching thereto a subscriber authentication module that stores therein first connection information and second connection information, the first connection information corresponding to a mobile communication network and being necessary for performing mobile communication over the mobile communication network, the second connection information being necessary for performing communication with a connection information management server provided corresponding to a mobile communication network and configured to perform rewrite control on the first connection information and performs mobile communication, to function as:
first reception circuitry for receiving, through a mobile communication network associated with the first connection information stored in the subscriber authentication module attached by the attachment circuitry, the second connection information associated with a connection information management server corresponding to a destination mobile communication network different from the mobile communication network, and storing the received second connection information in the subscriber authentication module; and
second reception circuitry for performing communication directly with the connection information management server corresponding to the destination mobile communication network by use of the second connection information received by the first reception circuitry and stored in the subscriber authentication module, to receive the first connection information associated with the destination mobile communication network, and storing the received first connection information in the subscriber authentication module.

10. A non-transitory computer readable medium including a transition control program to cause a computer to function as:

transition request input circuitry for inputting a transition request to make a transition between mobile communication networks over which a mobile communication device performs mobile communication, the mobile communication device including attachment circuitry for attaching thereto a subscriber authentication module that stores therein first connection information and second connection information, the first connection information corresponding to a mobile communication network and being necessary for performing mobile communication over the mobile communication network, the second connection information being necessary for performing communication with a connection information management server provided corresponding to a mobile communication network and configured to perform rewrite control on the first connection information;

first transmission circuitry for transmitting the second connection information associated with a connection information management server corresponding to a destination mobile communication network, to the mobile communication device associated with the transition request input by the transition request input circuitry, through a source mobile communication network; and second transmission circuitry for generating the first connection information associated with the destination mobile communication network for the mobile communication device associated with the transition request input by the transition request input circuitry, and transmitting the generated first connection information directly to the connection information management server corresponding to the destination mobile communication network.

\* \* \* \* \*